US011214278B2

(12) United States Patent
Hoop et al.

(10) Patent No.: US 11,214,278 B2
(45) Date of Patent: Jan. 4, 2022

(54) ONE-PEDAL DRIVE SYSTEM FOR A VEHICLE

(71) Applicant: FORD GLOBAL TECHNOLOGIES, LLC, Dearborn, MI (US)

(72) Inventors: Joshua Hoop, Plymouth, MI (US); Susan Rebecca Cikanek, Northville, MI (US); Bader M Badreddine, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 16/665,748

(22) Filed: Oct. 28, 2019

(65) Prior Publication Data

US 2021/0122387 A1 Apr. 29, 2021

(51) Int. Cl.
*B60W 50/10* (2012.01)
*B60L 7/10* (2006.01)
(Continued)

(52) U.S. Cl.
CPC .............. *B60W 50/10* (2013.01); *B60K 6/26* (2013.01); *B60L 7/10* (2013.01); *B60W 10/04* (2013.01); *B60W 10/184* (2013.01); *B60W 10/196* (2013.01); *B60W 20/00* (2013.01); *B60W 30/18063* (2013.01); *B60W 2540/10* (2013.01); *B60W 2540/12* (2013.01); *B60W 2710/18* (2013.01); *B60Y 2200/91* (2013.01); *B60Y 2200/92* (2013.01); *B60Y 2300/18058* (2013.01); *B60Y 2300/18125* (2013.01)

(58) Field of Classification Search
CPC .... B60W 50/10; B60W 10/04; B60W 10/184; B60W 10/196; B60W 20/00; B60K 6/26; B60L 7/10
See application file for complete search history.

(56) References Cited

U.S. PATENT DOCUMENTS 6,278,916 B1 * 8/2001 Crombez ............ B60L 15/2009
701/22
6,307,277 B1 * 10/2001 Tamai ...................... B60K 6/26
290/40 C (Continued)

FOREIGN PATENT DOCUMENTS

CN 108284771 A * 7/2018
KR 101618453 B1 * 5/2016

*Primary Examiner* — Peter D Nolan
*Assistant Examiner* — Wae L Louie
(74) *Attorney, Agent, or Firm* — David B. Kelley; Brooks Kushman P.C.

(57) ABSTRACT

A vehicle includes an accelerator pedal, a brake pedal, an electric machine, friction brakes, and a controller. The electric machine is configured to propel the vehicle and to brake the vehicle during regenerative braking. The friction brakes are configured to brake the vehicle. The controller is programmed to, responsive to an operator selection of a one-pedal drive mode, decrease vehicle speed via regenerative braking in response to releasing the accelerator pedal. The controller is further programmed to transition the vehicle to an inhibit state in which the friction brakes are applied to prevent vehicle creep in response to receiving an automated signal to disable the one-pedal drive mode and vehicle speed becoming zero while the one-pedal drive mode is selected.

20 Claims, 2 Drawing Sheets

(51) Int. Cl.
  *B60W 20/00*   (2016.01)
  *B60W 10/184*  (2012.01)
  *B60W 10/196*  (2012.01)
  *B60W 10/04*   (2006.01)
  *B60W 30/18*   (2012.01)
  *B60K 6/26*    (2007.10)

(56) References Cited

U.S. PATENT DOCUMENTS

| | | | | |
|---|---|---|---|---|
| 8,706,372 | B2* | 4/2014 | Cetinkaya | B60T 7/22 |
| | | | | 701/70 |
| 9,026,296 | B1* | 5/2015 | Johri | B60W 20/10 |
| | | | | 701/22 |
| 10,005,363 | B1 | 6/2018 | Correia et al. | |
| 10,155,521 | B2 | 12/2018 | Takeya et al. | |
| 2003/0183431 | A1* | 10/2003 | Cikanek | B60K 6/48 |
| | | | | 180/65.6 |
| 2006/0000659 | A1* | 1/2006 | Teslak | B60K 6/12 |
| | | | | 180/307 |
| 2013/0288855 | A1* | 10/2013 | Monsere | B60L 15/2045 |
| | | | | 477/24 |
| 2015/0307079 | A1* | 10/2015 | Hancasky | B60W 10/06 |
| | | | | 477/4 |
| 2016/0052510 | A1* | 2/2016 | Aldrich, III | F02N 19/005 |
| | | | | 701/22 |
| 2016/0101780 | A1* | 4/2016 | Park | B60W 50/14 |
| | | | | 701/70 |
| 2017/0327005 | A1* | 11/2017 | Meyer | B60K 6/48 |
| 2021/0122387 | A1* | 4/2021 | Hoop | B60W 30/18063 |
| 2021/0171015 | A1* | 6/2021 | Artail | B60L 53/22 |

* cited by examiner

ONE-PEDAL DRIVE SYSTEM FOR A VEHICLE

TECHNICAL FIELD

The present disclosure relates to hybrid/electric vehicles and one-pedal drive systems for hybrid/electric vehicles.

BACKGROUND

Hybrid/electric vehicles may include one-pedal drive systems that are configured to brake the vehicle through regenerative braking in response to releasing the accelerator pedal and without application of the brake pedal.

SUMMARY

A vehicle includes an accelerator pedal, an electric machine, friction brakes, and a controller. The electric machine is configured to propel the vehicle and to brake the vehicle during regenerative braking. The friction brakes are configured to brake the vehicle. The controller is programmed to, responsive to an operator selection of a one-pedal drive mode, increase vehicle speed in response to depressing the accelerator pedal and decrease vehicle speed via regenerative braking in response to releasing the accelerator pedal. The controller is further programmed to, responsive to a vehicle speed becoming zero while the one-pedal drive mode is selected and to receiving an automated signal to disable the one-pedal drive mode, transition the vehicle to an inhibit state in which the friction brakes are applied to prevent vehicle creep in response to vehicle speed becoming zero. The controller is further programmed to, responsive to presence of the inhibit state, maintain application of the friction brakes to maintain vehicle speed at zero in response to depressing the accelerator pedal to a first position that is less than a threshold, and to release the friction brakes, increase vehicle speed, and return to the one-pedal drive mode in response to depressing the accelerator pedal to a second position that is greater than the threshold.

A vehicle includes an accelerator pedal, a brake pedal, an electric machine, friction brakes, and a controller. The accelerator pedal is configured to generate commands to increase vehicle speed. The brake pedal is configured to generate commands to decrease vehicle speed. The electric machine is configured to propel the vehicle and to brake the vehicle during regenerative braking. The friction brakes are configured to brake the vehicle. The controller is programmed to, responsive to an operator selection of a one-pedal drive mode, decrease vehicle speed via regenerative braking in response to releasing the accelerator pedal in the absence of depressing the brake pedal, transition the vehicle to an inhibit state in which the friction brakes are applied to prevent vehicle creep in response to receiving an automated signal to disable the one-pedal drive mode and vehicle speed becoming zero while the one-pedal drive mode is selected, and to exit the inhibit state, release the friction brakes, and increase vehicle speed in response to depressing the accelerator pedal to a position that is greater than a threshold.

A vehicle includes an accelerator pedal, a brake pedal, an electric machine, friction brakes, and a controller. The electric machine is configured to propel the vehicle and to brake the vehicle during regenerative braking. The friction brakes are configured to brake the vehicle. The controller programmed to, responsive to an operator selection of a one-pedal drive mode, increase vehicle speed in response to depressing the accelerator pedal and decrease vehicle speed via regenerative braking in response to releasing the accelerator pedal in the absence of depressing the brake pedal. The controller is further programmed to, responsive to a vehicle speed becoming zero while the one-pedal drive mode is selected and to receiving an automated signal to disable the one-pedal drive mode, transition the vehicle to an inhibit state in which the friction brakes are applied to prevent vehicle creep. The controller is further programmed to, responsive to presence of the inhibit state, maintain application of the friction brakes to maintain vehicle speed at zero in response to depressing the accelerator pedal to a first position that is less than a threshold, to release the friction brakes, increase vehicle speed, exit the inhibit state, and return to the one-pedal drive mode in response to depressing the accelerator pedal to a second position that is greater than the threshold, to maintain application of the friction brakes to maintain vehicle speed at zero in response to releasing the brake pedal while an accelerator pedal position is less than the threshold, to maintain application of the friction brakes to maintain vehicle speed at zero in response to an operator deselection of the one-pedal drive mode and depressing the accelerator pedal to a third position that is less than a second threshold, and to release the friction brakes, increase vehicle speed, exit the inhibit state, and operate the vehicle in a nominal two-pedal drive mode in response to the operator deselection of the one-pedal drive mode and depressing the accelerator pedal to a fourth position that is greater than the second threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
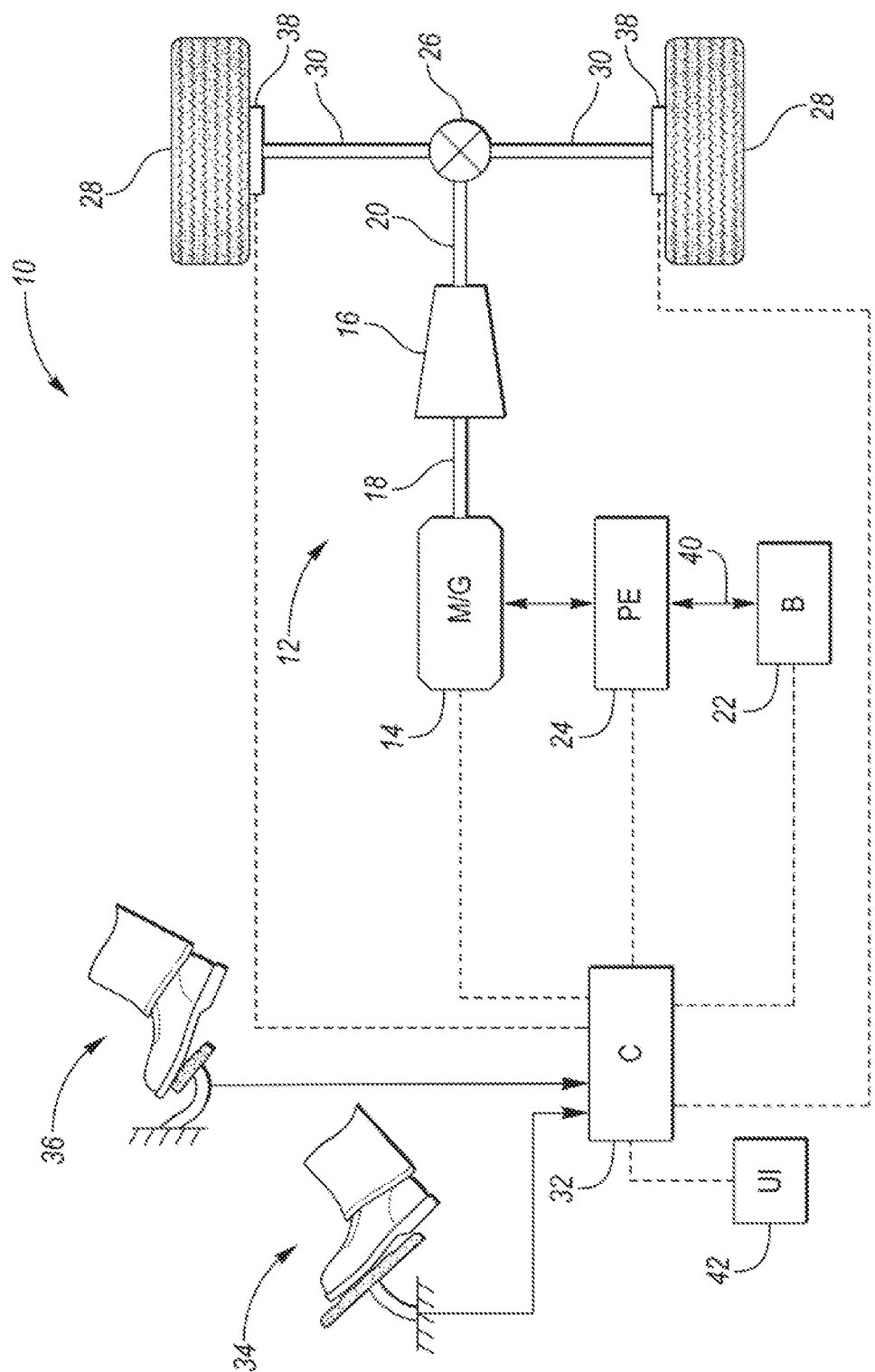
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox)

16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shall 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The M/G 14 is configured to deliver power to the wheels 28 to drive the vehicle 28 via the various connections described above. It should be understood that the connections between the M/G 14 and the wheels 28 described herein is the illustrative purposes only and that other drivetrain configurations between the M/G 14 and the wheels 28 may be implemented in the alternative.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROW (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. Stated in other terms, increasing an amount of depression of the accelerator pedal is configured to generate a command to increase the speed of the vehicle 10 while decreasing an amount of depression of the accelerator pedal is configured to generate a command to decrease the speed of the vehicle 10. A brake pedal 36 is also used by the driver of the vehicle to provide a demanded braking torque to slow or decrease the speed of the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The friction brakes 38 are configured to apply torque to the wheels in response to depression of the brake pedal 36 in order to slow or brake the vehicle 10. The controller 32 also controls the timing of gear shifts within the transmission 16.

The M/G 14 may act as a motor and provide a driving force for the powertrain 12. To drive or propel the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22. Regenerative braking also results in slowing or braking the vehicle.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may include a one-pedal drive mode. In the one-pedal drive mode, the speed of the vehicle may be increased in response to increasing a depressed position of the accelerator pedal 34 while releasing the accelerator pedal 34 results in breaking the vehicle 10 via regenerative braking through the M/G 14. More specifically, the vehicle 10 may be slowed or braked via releasing the accelerator pedal. 34 alone without an application or depression of the brake pedal 36. If the vehicle 10 has conic to a stopped position where the vehicle speed is zero, it may be desirable to ensure that the vehicle 10 remains at zero speed in the event the vehicle operator has not applied the brake pedal 36 in one-pedal drive mode once the vehicle has obtained zero speed. The method described herein presents an unintended acceleration of the vehicle 10 once the vehicle has obtained zero speed in the one-pedal drive mode by applying the friction brakes 38 and by requiring a depression of the accelerator pedal 34 to exceed a threshold prior to the friction brakes 38 being released and allowing an increase in speed of the vehicle 10. The vehicle 10 may include a user interface 42, such as control panel, touch screen, push button, etc. that is in communication with the controller 32. The controller 32 may be configured to enable and disable the one-pedal driving mode based on an operator selected input from the user interface 42.

Figure 2:
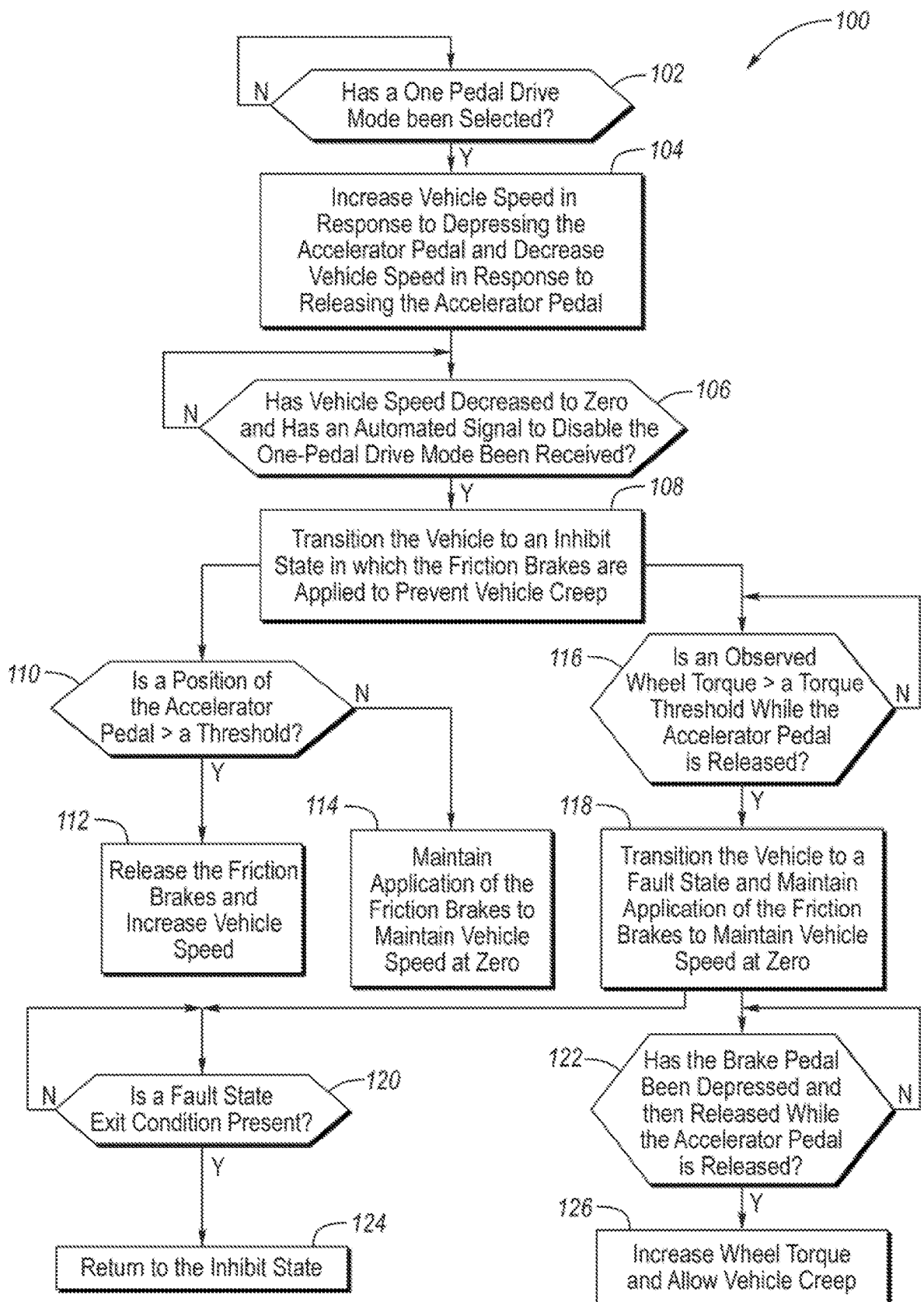
FIG. 2 is a flowchart illustrating a method for controlling a one-pedal drive system in a hybrid/electric vehicle.

Referring to FIG. 2, a flowchart of a method 100 for controlling a one-pedal drive system in a hybrid/electric vehicle (e.g., vehicle 10) is illustrated. The method 100 may be stored as control logic and/or an algorithm within the controller 32. The controller 32 may implement the method 100 by controlling the various components of the vehicle 10. The method 100 begins at block 102 where it is determined if a one-pedal drive mode has been selected by an operator of the vehicle 10 via a user interlace (e.g., user interface 42). If the one-pedal drive mode has not been selected the method 100 recycles back to the beginning of block 102. If the one pedal-drive mode has been selected, the vehicle 10 is transitioned into the one-pedal drive mode and the method 100 moves on to block 104. At block 104, the method 100 increases the speed of the vehicle 10 in response to depressing the accelerator pedal 34 and decreases the speed of the vehicle 10 via regenerative braking in response to releasing the accelerator pedal 34. More specifically, at block 104 the method 100 may decrease the speed of the vehicle 10 via regenerative braking in response to releasing the accelerator pedal 34 in the absence of an application or depression of the brake pedal 36.

Method 100 is also configured to determine if the speed of the vehicle 10 has decreased to zero and if the controller 32 has received an automated signal to disable the one-pedal drive mode while the one-pedal drive mode is selected at block 106. An automated signal to disable the one-pedal drive mode may include a system error such as: a broken solenoid valve in the anti-lock braking module (under such a circumstance the anti-lock braking module would not be able fill the brake cylinders with hydraulic fluid unless the driver presses the brake pedal which would automatically displace the fluid and fill the brake cylinders with hydraulic fluid), a detected fault in the system such as bad accelerator pedal sensor in which case the driver input to the accelerator pedal position could not be validated, a fault in the button on the user interface 42 that selects and/or deselects the one-pedal drive mode, etc. An automated signal to disable the one-pedal drive mode may also be the result of the selection of an incompatible drive mode by the vehicle operator, activation of a cruise control system, activation of an adaptive cruise control system, activation of an adaptive cruise control stop and go system, a mismatch between position of the gear selector of the transmission (PRNDL) and actual transmission range, etc. If the speed of the vehicle 10 has not decreased to zero or if the controller has not received an automated signal to disable the one-pedal drive mode, the method 100 recycles back to the beginning of block 106. If the speed of the vehicle 10 has decreased to zero and the controller 32 has received an automated signal to disable the one-pedal drive mode while the one-pedal drive mode is selected, the method 100 moves on to block 108 where the vehicle 10 is transitioned to an inhibit state in which the friction brakes 38 are applied and a zero torque command is sent to the controller 32 to maintain vehicle speed at zero and to prevent vehicle creep. Once the vehicle is in the inhibit state, it is desirable to ensure that the vehicle remains at zero speed and that the friction brakes 38 remain engaged in order to prevent the vehicle 10 from moving without having a definitive command from the vehicle operator to accelerate the vehicle 10. Also, once in the inhibit state the vehicle 10 will remain in the inhibit state if the vehicle operator happens to deselect the one-pedal drive mode via the user interface 42. The driver can exit the inhibit state by pressing the accelerator pedal above a calibratable amount, when either the operator deselects the one-pedal drive mode via the user interface 42, or the one-pedal drive mode is disabled automatically from an automated signal; in either case the vehicle will enter the nominal two-pedal operation drive mode.

Once the vehicle 10 is in the inhibit state, the method 100 determines if a position or an amount of depression of the accelerator pedal 34 is greater than a threshold at block 110. If the position or an amount of depression of the accelerator pedal 34 is greater than the threshold (this may be referred to as a first position of the accelerator pedal 34), the method 100 moves on to block 112 where the vehicle 10 exits the inhibit state, the friction brakes 38 are released, and the speed of the vehicle 10 is increased. At block 112, the control of the vehicle 10 may be based on the one-pedal drive mode if the operator selection of the one-pedal drive mode has remained or may be based on a nominal two-pedal operation drive mode where the one-pedal drive mode is disabled and the vehicle speed is controlled via both the accelerator pedal 34 and brake pedal 36. Stated in other terms, the control of the vehicle 10 may return to the one-pedal drive mode if the operator had not deselected the one-pedal drive mode while in the inhibit state or the control of the vehicle 10 may transition to the nominal two-pedal operation drive mode if the operator had deselected the one-pedal drive mode while in the inhibit state. The driver can exit the inhibit state by pressing the accelerator pedal above a calibratable amount, when either the operator deselects the one-pedal drive mode via the user interface 42, or the one-pedal drive mode is disabled automatically from an automated signal; in either case the vehicle will enter the nominal two-pedal operation drive mode.

The one-pedal drive mode and the nominal two-pedal operation drive mode may have different torque tables that are configured to command the torque to the wheels to propel the vehicle 10 based on a position of the accelerator pedal 34.

If the position or an amount of depression of the accelerator pedal 34 is not greater than the threshold (this may be referred to as a second position of the accelerator pedal 34), the method 100 moves on to block 114 where the vehicle 10 remains in the inhibit state and the application of the friction brakes 38 is maintained to maintain the speed of the vehicle 10 at zero. If the vehicle 10 remains in the inhibit state and the accelerator pedal is released or the position or the amount of depression of the accelerator pedal 34 is not greater than the threshold, the method 100 may ignore any command that may be generated by an application of the brake pedal 36. For example, at block 114, if the brake pedal 36 is depressed and released in the inhibit mode while the vehicle 10 is at zero speed and while the position or the amount of depression of the accelerator pedal 34 is not greater than the threshold, the vehicle 10 will remain in the inhibit state and the application of the friction brakes 38 will be maintained to maintain the speed of the vehicle 10 at zero regardless of the position of the brake pedal 36.

The threshold value at block 110 may have the same value or may have a different value depending on whether the operator selection of the one-pedal drive mode has remained or if the operator deselected the one-pedal drive mode while in the inhibit state. For example, if the vehicle operator had deselected the one-pedal drive mode while in the inhibit state and if the position or an amount of depression of the accelerator pedal 34 is greater than a second threshold that is different that the first threshold (this may be referred to as a third position of the accelerator pedal 34), the method 100 moves on to block 112 where the vehicle 10 exits the inhibit state, the friction brakes 38 are released, the speed of the vehicle 10 is increased, and the vehicle is controlled according to nominal two-pedal operation drive mode. If the position or an amount of depression of the accelerator pedal 34 is not greater than the second threshold (this may be referred to as a fourth position of the accelerator pedal 34), the method 100 moves on to block 114 where the vehicle 10 remains in the inhibit state and the application of the friction brakes 38 is maintained to maintain the speed of the vehicle 10 at zero.

Also, once the vehicle 10 is in the inhibit state, the method 100 determines if an observed or measured wheel torque is greater than a torque threshold while the accelerator pedal 34 remains released at block 116. The observed or measured wheel torque may be measured by torque sensors at the wheels 28 of the vehicle 10. In the inhibit state, the commanded torque is zero, therefore any observed or measured wheel torque that exceeds an allowable tolerance (i.e., the torque threshold in block 116) may be due to an error within the control system. If the observed or measured wheel torque is not greater than the torque threshold at block 116, the method 100 recycles back to the beginning of block 116. If the observed or measured wheel torque is greater than the torque threshold at block 116, the method 100 moves on to block 118 where the vehicle 10 is transitioned to a fault state and the application of the friction brakes 38 is maintained to maintain the speed of the vehicle 10 at zero. Once the vehicle 10 is in the fault state, the method 100 determines if a fault state exit condition is present at block 120 and determines if the brake pedal 36 has been depressed and then released while the accelerator pedal 34 is released, at block 122. If a fault state exit condition is not present at block 120, the method 100 recycles back to the beginning of block 120. If a fault state exit condition is present, the method 100 moves on to block 124 where the vehicle 10 is returned to the inhibit state (e.g., block 108). If the brake pedal 36 has not been depressed and then released at block 122 while the accelerator pedal 34 is released, the method 100 recycles back to the beginning of block 122. If the brake pedal 36 has been depressed and then released at block 122 while the accelerator pedal 34 is released, the method 100 moves on to block 126 where the wheel torque is increased to allow vehicle creep.

Returning to block 120, a fault state exit condition may include the observed wheel torque decreasing to less than the torque threshold within a predetermined period of time after the observed wheel torque exceeded the torque threshold, the accelerator pedal 34 being depressed or transitioned to a position that is greater than a threshold within a predetermined period of time after the observed wheel torque exceeded the torque threshold, the brake pedal 36 being depressed or transitioned to a position that greater than a threshold within a predetermined period of time after the observed wheel torque exceeded the torque threshold, or the vehicle 10 being shut off with a key cycle followed by the vehicle 10 being turned back on by the operator.

It should be understood that the flowchart in FIG. 2 is for illustrative purposes only and that the method 100 should not be construed as limited to the flowchart in FIG. 2. Some of the steps of the method 100 may be rearranged while others may be omitted entirely. It should be further understood that the designations of first, second, third, fourth, etc. for thresholds, time periods, pedal positions, or any other factor relevant to the method 100 in FIG. 2 may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an accelerator pedal;
an electric machine configured to propel the vehicle and to brake the vehicle during regenerative braking;
friction brakes configured to brake the vehicle; and
a controller programmed to,
responsive to an operator selection of a one-pedal drive mode,
increase vehicle speed in response to depressing the accelerator pedal, and
decrease vehicle speed via regenerative braking in response to releasing the accelerator pedal, and
responsive to a vehicle speed becoming zero while the one-pedal drive mode is selected and to receiving an automated signal to disable the one-pedal drive mode,
transition the vehicle to an inhibit state in which the friction brakes are applied to prevent vehicle creep in response to vehicle speed becoming zero,
responsive to presence of the inhibit state,
maintain application of the friction brakes to maintain vehicle speed at zero in response to depressing the accelerator pedal to a first position that is less than a threshold, and
release the friction brakes, increase vehicle speed, and return to the one-pedal drive mode in response to depressing the accelerator pedal to a second position that is greater than the threshold.

2. The vehicle of claim 1 further comprising a brake pedal and wherein the controller is further programmed to, in response to releasing the brake pedal while an accelerator pedal position is less than the threshold in the inhibit state, maintain application of the friction brakes to maintain vehicle speed at zero.

3. The vehicle of claim 1, wherein the controller is further programmed to, in response to an operator deselection of the one-pedal drive mode and depressing the accelerator pedal to a third position that is less than a second threshold in the inhibit state, maintain application of the friction brakes to maintain vehicle speed at zero.

4. The vehicle of claim 3, wherein the controller is further programmed to, in response to the operator deselection of the one-pedal drive mode and depressing the accelerator pedal to a fourth position that is greater than the second threshold in the inhibit state, release the friction brakes, increase vehicle speed, and operate the vehicle in a nominal two-pedal drive mode.

5. The vehicle of claim 1, wherein the controller is further programmed to, in response to an observed wheel torque exceeding a torque threshold and the accelerator pedal being released in the inhibit state, transition the vehicle to a fault state and maintain application of the friction brakes to maintain vehicle speed at zero.

6. The vehicle of claim 5 further comprising a brake pedal and wherein the controller is further programmed to, in response to depressing and releasing the brake pedal while the accelerator pedal is released in the fault state, increase the wheel torque to allow vehicle creep.

7. The vehicle of claim 5, wherein the controller is further programmed to, in response to the observed wheel torque decreasing to less than the torque threshold within a predetermined period of time after the observed wheel torque exceeded the torque threshold, transition the vehicle to from the fault state to the inhibit state.

8. The vehicle of claim 1 further comprising a user interface, and wherein the controller is configured to enable and disable the one-pedal driving mode based on an operator selected input from the user interface.

9. A vehicle comprising:
an accelerator pedal configured to generate commands to increase vehicle speed;
a brake pedal configured to generate commands to decrease vehicle speed;
an electric machine configured to propel the vehicle and to brake the vehicle during regenerative braking;
friction brakes configured to brake the vehicle; and
a controller programmed to,
  responsive to an operator selection of a one-pedal drive mode,
    decrease vehicle speed via regenerative braking in response to releasing the accelerator pedal in the absence of depressing the brake pedal,
    transition the vehicle to an inhibit state in which the friction brakes are applied to prevent vehicle creep in response to receiving an automated signal to disable the one-pedal drive mode and vehicle speed becoming zero while the one-pedal drive mode is selected, and
    exit the inhibit state, release the friction brakes, and increase vehicle speed in response to depressing the accelerator pedal to a position that is greater than a threshold.

10. The vehicle of claim 9, wherein the controller is further programmed to, in response to depressing the accelerator pedal to a second position that is less than the threshold in the inhibit state, remain in the inhibit state and maintain application of the friction brakes to maintain vehicle speed at zero.

11. The vehicle of claim 9, wherein the controller is further programmed to, in response to releasing the brake pedal while an accelerator pedal position is less than the threshold in the inhibit state, remain in the inhibit state and maintain application of the friction brakes to maintain vehicle speed at zero.

12. The vehicle of claim 9, wherein the controller is further programmed to, in response to an operator deselection of the one-pedal drive mode and depressing the accelerator pedal to a second position that is less than a second threshold in the inhibit state, remain in the inhibit state and maintain application of the friction brakes to maintain vehicle speed at zero.

13. The vehicle of claim 12, wherein the controller is further programmed to, in response to the operator deselection of the one-pedal drive mode and depressing the accelerator pedal to a third position that is greater than the second threshold in the inhibit state, exit the inhibit state, release the friction brakes, increase vehicle speed, and operate the vehicle in a nominal two-pedal drive mode.

14. The vehicle of claim 9, wherein the controller is further programmed to, in response to an observed wheel torque exceeding a torque threshold and the accelerator pedal being released in the inhibit state, transition the vehicle to a fault state and maintain application of the friction brakes to maintain vehicle speed at zero.

15. The vehicle of claim 14, wherein the controller is further programmed to, in response to depressing and releasing the brake pedal while the accelerator pedal is released after transitioning to the fault state, increase the wheel torque to allow vehicle creep.

16. The vehicle of claim 14, wherein the controller is farther programmed to, in response to the observed wheel torque decreasing to less than the torque threshold within a predetermined period of time after the observed wheel torque exceeded the torque threshold, transition the vehicle to from the fault state to the inhibit state.

17. The vehicle of claim 9 further comprising a user interface, and wherein the controller is configured to enable and disable the one-pedal driving mode based on an operator selected input from the user interface.

18. A vehicle comprising:
an accelerator pedal;
a brake pedal;
an electric machine configured to propel the vehicle and to brake the vehicle during regenerative braking;
friction brakes configured to brake the vehicle; and
a controller programmed to,
  responsive to an operator selection of a one-pedal drive mode,
    increase vehicle speed in response to depressing the accelerator pedal, and
    decrease vehicle speed via regenerative braking in response to releasing the accelerator pedal in the absence of depressing the brake pedal,
  responsive to a vehicle speed becoming zero while the one-pedal drive mode is selected and to receiving an automated signal to disable the one-pedal drive mode,
    transition the vehicle to an inhibit state in which the friction brakes are applied to prevent vehicle creep, and
  responsive to presence of the inhibit state,
    maintain application of the friction brakes to maintain vehicle speed at zero in response to depressing the accelerator pedal to a first position that is less than a threshold,
    release the friction brakes, increase vehicle speed, exit the inhibit state, and return to the one-pedal drive mode in response to depressing the accelerator pedal to a second position that is greater than the threshold,
    maintain application of the friction brakes to maintain vehicle speed at zero in response to releasing the brake pedal while an accelerator pedal position is less than the threshold,
    maintain application of the friction brakes to maintain vehicle speed at zero in response to an operator deselection of the one-pedal drive mode and depressing the accelerator pedal to a third position that is less than a second threshold, and
    release the friction brakes, increase vehicle speed, exit the inhibit state, and operate the vehicle in a nominal two-pedal drive mode in response to the operator deselection of the one-pedal drive mode and depressing the accelerator pedal to a fourth position that is greater than the second threshold.

19. The vehicle of claim 18, wherein the controller is further programmed to, in response to an observed wheel torque exceeding a torque threshold and the accelerator pedal being released in the inhibit state, transition the vehicle to a fault state and maintain application of the friction brakes to maintain vehicle speed at zero.

20. The vehicle of claim 19, wherein the controller is further programmed to,
   in response to depressing and releasing the brake pedal while the accelerator pedal is released after transitioning to the fault state, increase the wheel torque to allow vehicle creep.

\* \* \* \* \*